(12) United States Patent
Nomen Calvet et al.

(10) Patent No.: US 11,619,352 B2
(45) Date of Patent: Apr. 4, 2023

(54) REGASIFICATION DEVICE

(71) Applicants: WGA Water Global Access, S.L., Sispony (AD); Juan Eusebio Nomen Calvet, L'Aldosa (AD); Dan Alexandru Hanganu, Barcelona (ES)

(72) Inventors: Juan Eusebio Nomen Calvet, L'Aldosa (AD); Dan Alexandru Hanganu, Barcelona (ES)

(73) Assignee: WGA WATER GLOBAL ACCESS, S.L., Sispony (AD)

( * ) Notice: Subject to any disclaimer, the term of this patent is extended or adjusted under 35 U.S.C. 154(b) by 1099 days.

(21) Appl. No.: 16/322,722

(22) PCT Filed: Aug. 2, 2016

(86) PCT No.: PCT/ES2016/070589
§ 371 (c)(1),
(2) Date: Feb. 1, 2019

(87) PCT Pub. No.: WO2018/024921
PCT Pub. Date: Feb. 8, 2018

(65) Prior Publication Data
US 2021/0048147 A1 Feb. 18, 2021

(51) Int. Cl.
*F17C 9/02* (2006.01)
*F24F 3/14* (2006.01)
*F28D 7/10* (2006.01)

(52) U.S. Cl.
CPC ........ *F17C 9/02* (2013.01); *F17C 2201/0119* (2013.01); *F17C 2201/0128* (2013.01);
(Continued)

(58) Field of Classification Search
CPC ................ F17C 9/02; F17C 2201/0119; F17C 2201/0128; F17C 2221/033;
(Continued)

(56) References Cited

U.S. PATENT DOCUMENTS

| 3,421,574 A | 1/1969 | Kals |
| 3,986,340 A | 10/1976 | Bivins, Jr. |

(Continued)

FOREIGN PATENT DOCUMENTS

| CN | 202834735 | 3/2013 |
| JP | 2001182891 | 7/2001 |

OTHER PUBLICATIONS

International Search Report of corresponding International Application No. PCT/ES2016/070589, dated Feb. 23, 2017.

*Primary Examiner* — Joel M Attey
(74) *Attorney, Agent, or Firm* — Gardner, Linn, Burkhart & Ondersma LLP

(57) ABSTRACT

A device for regasifying liquefied natural gas (LNG) and co-generating cool freshwater and cool dry air, which device comprises at least one hermetic outer recipient containing an intermediate fluid in liquid phase and gaseous phase, the fluid having high latent heat and high capillary properties, traversed by at least one intermediate fluid evaporation tube inside the tube flows moist air whose moisture condenses, at least partly, in a capillary condensation regime on its inner face and on its outer face the liquid phase of the intermediate fluid evaporates, at least partially, in a capillary evaporation regime, and traversed by at least one LNG evaporation tube on which outer face the gaseous phase of the intermediate (Continued)

fluid condenses at least partially, under a capillary condensation regime, and inside the tube, the LNG is heated and changes phase and the regasified natural gas (NG) is heated to a temperature greater than 5° C.

18 Claims, 4 Drawing Sheets

(52) U.S. Cl.
CPC ............ *F17C 2221/033* (2013.01); *F17C 2223/0161* (2013.01); *F17C 2225/0123* (2013.01); *F17C 2227/039* (2013.01); *F17C 2227/0313* (2013.01); *F17C 2227/0318* (2013.01); *F17C 2260/032* (2013.01); *F17C 2265/05* (2013.01); *F24F 2003/1446* (2013.01); *F28D 7/103* (2013.01)

(58) Field of Classification Search
CPC ...... F17C 2223/0161; F17C 2225/0123; F17C 2227/0313; F17C 2227/0318; F17C 2227/039; F17C 2227/0311; F17C 2260/032; F17C 2265/05; F24F 2003/1446; F28D 7/066; F28D 7/103
See application file for complete search history.

(56) References Cited

U.S. PATENT DOCUMENTS

| | | | | |
|---|---|---|---|---|
| 4,224,802 A | * | 9/1980 | Ooka | F17C 9/02 62/434 |
| 4,422,501 A | * | 12/1983 | Franklin | F28D 15/04 165/104.23 |
| 4,582,121 A | * | 4/1986 | Casey | F28D 15/0266 165/104.21 |
| 4,807,697 A | * | 2/1989 | Gernert | F28D 15/0233 122/366 |
| 6,367,265 B1 | * | 4/2002 | Yamamoto | F17C 7/04 62/52.1 |
| 6,367,429 B2 | * | 4/2002 | Iwasaki | F28D 15/02 122/31.1 |
| 8,973,398 B2 | * | 3/2015 | Coyle | F17C 9/02 62/611 |
| 10,203,161 B2 | * | 2/2019 | Hanganu | F25B 39/022 |
| 2007/0214807 A1 | | 9/2007 | Faka | |
| 2016/0146403 A1 | | 5/2016 | Egashira et al. | |

* cited by examiner

REGASIFICATION DEVICE

CROSS REFERENCE TO RELATED APPLICATIONS

The present application is a § 371 national stage of International Application PCT/ES2016/070589, filed Aug. 2, 2016, which is hereby incorporated herein by reference in its entirety.

FIELD OF THE INVENTION

The present invention relates to a regasification device for liquefied natural gas and co-generation of cool freshwater and cool dry air that uses moist ambient air as energy source and uses an intermediate fluid as a means of heat exchange.

BACKGROUND OF THE INVENTION

The regasification systems for liquefied natural gas, LNG, mainly use three sources of energy:
1—Combustion of fossil fuels, with the corresponding emission of $CO_2$,
2—Ambient air with the large size problem of the necessary facilities and the ice formation problem,
3—Seawater with problems of corrosion, ice formation, direct mortality of sea life due to direct contact with cool surfaces and impact on sea life due to the return to the marine environment of water from which latent heat has been extracted and where chemicals have been added. Seawater is used mainly in devices called Open Rack Vaporizers, ORV, in which the seawater is poured directly onto LNG evaporation tubes. It is a system widely used for its low cost operation and compact size that is achieved with a modular format of LNG evaporation tubes that are usually about six meters high and are placed in batteries on which a continuous water shower is provided from the seawater.

To avoid the problems of ice formation, corrosion and mortality of sea life by contact with cool surfaces, LNG regasification systems that use ambient air and seawater as indirect heat sources where heat reaches the LNG passing through an intermediate fluid have been created.

These systems include:
Intermediate Fluid Vaporizers of water-glycol or other intermediate fluid, hereafter IFV glycol. For a better description of the state of the art FIG. 7 presents a scheme of these devices in which an external source of energy 24 is used, such as air heat, seawater heat, or a residual energy source to heat the wall of a heat exchange tube 22 into which an intermediate liquid flows, such as water-glycol, GL. This heated intermediate fluid is provided inside a heat exchanger with at least one LNG evaporation tube 23 in whose interior LNG flows to regasify, the LNG evaporation tube 23 being submerged in a volume of intermediate liquid GL.

When these systems use seawater as a heat source, the inclusion of intermediate fluid solves the problems of marine mortality by contact with cool tubes but does not avoid the environmental problems already exposed caused by the extraction of an equivalent amount of seawater energy to the regasification energy.

When these systems use ambient air as an energy source, ice formation is avoided but they maintain the problem of requiring extensive facilities.

The thermal coefficients of the walls of the heat exchange tube 22 and the LNG evaporation tube 23 limit the thermal coefficient of the system hence its performance and affect the size and cost of the installation.

Intermediate Fluid Vaporizers of hydrocarbons, hereinafter HC-IFV, are systems that use the sensible heat of seawater and use an intermediate fluid to avoid the problems of corrosion, scaling and mortality caused by ORVs. The use of an intermediate fluid and up to three shell and tubes circuits allow solving the problem of ice formation, the problem of scale on tubes, the problem of marine mortality by contact with cool tubes, but still have the problem of affecting sea life due to the return to the marine environment of seawater from which a quantity of sensible heat equivalent to the energy required by the LNG regasification process has been extracted.

To facilitate the description of the state of the art, and although the HC-IFC devices can be compartmentalized into up to three effects, the components and the essential thermal circuit of a HC-IFC can be schematized in FIG. 6 that shows an hermetic container inside which there is at least one intermediate fluid evaporation tube 17 inside which seawater flows to supply energy to the device, this intermediate fluid evaporation tube 17 is submerged into a volume of the liquid phase of an intermediate fluid 18 which is usually a hydrocarbon such as butane or propane that captures the energy of seawater through the wall of the intermediate fluid evaporation tube 17 and evaporates by bubbling 16 from the outer face of the intermediate fluid evaporation tube 17. The gaseous phase of the intermediate fluid evaporated by bubbling 16 rises to the surface of the volume of the liquid phase of intermediate fluid 18 and it is distributed in gaseous phase 19 within the upper volume of the hermetic container. The hermetic container is crossed by at least one LNG evaporation tube 20 into which LNG flows to regasify. On the outer face of the LNG evaporation tube 20 the gaseous phase of the intermediate fluid condenses and the intermediate fluid drips into its liquid phase 21. The latent heat evolved in the condensation of the intermediate fluid on the outer face of the LNG evaporation tube 20 passes through the wall of the tube and inside the LNG evaporation tube 20 it is transformed into latent heat for the LNG phase change to natural gas NG and sensible heat for the increase of its temperature.

The HC-IFC devices have a thermal coefficient conditioned by the limitations of the thermal coefficients of each of the faces of the intermediate fluid evaporation tube 17 and the LNG evaporation tube 20, by the thermal density of the heat source and by the latent heat of evaporation of intermediate fluid.

These thermal conditions lead to the HC-IFV devices having large dimensions, requiring very robust components and do not allow the use low energy density sources such as moist ambient air.

To reduce the size of the regasification devices, the area of occupied land, the investment in exchange walls and the costs of their maintenance, it is necessary to increase the thermal coefficient of the faces of the heat exchange surfaces to improve the overall resulting thermal coefficient of the system.

Similarly, in order to reduce the environmental impact, it is necessary to reduce the use of energy from combustion of fossil fuels, reduce the extraction of heat from seawater and reduce the spillage of chemical cleaning products into the environment.

SUMMARY OF THE INVENTION

The present invention seeks to solve one or more of the disadvantages set forth above by means of a regasification device for liquefied natural gas, LNG, which allows the co-generation of freshwater and cool air, as defined in the claims.

The improvement of the thermal coefficient of the LNG regasification device, that is, the energy that is transmitted per unit area of heat exchange is a determining factor to reduce the investment costs, improve the efficiency of the device and, above all, allow the use of low thermal energy density sources whose use is impractical in facilities with low thermal coefficients.

The improvement of the thermal coefficient of a LNG regasification device entails the improvement of the thermal coefficient of the faces of the tubes that exchange heat. The thermal coefficient of the face of a heat exchange tube can be improved if on this face condensation or evaporation of a fluid with a high latent heat of phase change occurs instead of a mere exchange of sensible heat. In case evaporation or condensation occurs on the face of a heat exchange tube, the thermal coefficient can be improved if this condensation is carried out at least in part under the capillary condensation regime or if the evaporation is carried out at least in part in capillary regime that is, from the curvature of the liquid-vapor interface that occurs on the surface of a liquid meniscus.

For greater clarity of the description, the LNG regasification device object of this patent can be described following a comparison with the components of the thermal circuit of the current HC-IFV, describing the improvements that allow increasing the thermal efficiency of each of them and the resulting overall thermal coefficient.

First, the inner face of the intermediate fluid evaporation tube is coated at least in part with micro slots, microgrooves, sintering or other capillary structure that allows capillary condensation of the gaseous phase of a fluid on the inner face of the tube. This advance allows the LNG regasification device to use moist air as an energy source. So that the water vapor contained in the air condenses at least in part under capillary condensation regime on the inner face of the intermediate fluid evaporation tube and gives up its latent heat as well as part of the sensible heat of air and water and all this energy passes through the wall of the intermediate fluid evaporation tube and is transformed into latent heat for the phase change of the intermediate fluid on the outer face of the intermediate fluid evaporation tube. In order to prevent the accumulation of condensed water on the inner face of the intermediate fluid evaporation tube, which would limit its thermal properties, at least one drain line is added, which neatly channels the condensed water and evacuates it.

Second, we introduce the benefits of capillary condensation on the outer face of the LNG evaporation tube. For this purpose, hydrocarbons such as propane or butane cannot be used as intermediate fluid due to the lack of capillary properties. $H_2O$ or aqueous solutions of glycol or other solutions with a high latent heat and high capillary properties is used and the outer face of the LNG evaporation tube is covered with microslots, microgrooves or a capillary structure that allow capillary condensation of the gaseous phase of the intermediate fluid on the outer face of the LNG regasification tube.

Given that the LNG regasification device has an external hermetic container and that inside there is only the intermediate fluid in its liquid and gaseous phases, the intermediate fluid will not adopt its solid phase on the outer face of the LNG evaporation tube, provided that the condensed liquid phase on the LNG evaporation tube is exposed to a direct contact with the gas phase flow and does not form accumulations in which a thermal stratification occurs that allows solid phase formation in isolated contact areas with the gaseous phase energy carrier. For this it is important that the liquid phase is rapidly evacuated from microslots or microgrooves and does not accumulate within a sintering or capillary structure. The evacuation of the liquid phase can be achieved with a design such as microslots or microgrooves perpendicular to the axis of the tube and with longitudinal deflectors that channel the liquid flow out of the wall of the LNG evaporation tube.

Third, we introduce the benefits of capillary evaporation on the outer face of the intermediate fluid evaporation tube. For this, the intermediate fluid evaporation tube is no longer submerged within a volume of the liquid phase of the intermediate fluid and we coat the outer face of the intermediate fluid evaporation tube at least in part of microslots, microgrooves, sintering or other capillary structure that allows the menisci formation of the liquid phase of an intermediate fluid with high capillary properties and high latent heat of evaporation such as water, aqueous solutions of glycol or other solutions with similar capillary properties. On the surface of these menisci, the liquid-vapor interface is curved and high-flow evaporation occurs at the end of this curvature, the capillary evaporation.

For the correct fluid logistics, that is, for the outer face of the intermediate fluid evaporation tube to be wet and to evaporate, it is necessary that at least part of the outer face of the intermediate fluid evaporation tube be covered with sintering or another capillary structure and touch the liquid phase of the intermediate fluid accumulated in the bottom of the hermetic container so that this liquid phase of the intermediate fluid rises by capillary action and wet the outer face of the intermediate fluid evaporation tube.

In a complementary manner, the intermediate fluid evaporation tube can be positioned in parallel or at least partially below the LNG evaporation tube so that the liquid phase of the intermediate fluid condensing on the outer face of the LNG evaporation tube drips onto the outer face of the intermediate fluid evaporation tube. These droplets of liquid phase of the intermediate fluid can fall onto the sintering coating or other capillary structure of the outer face of the intermediate fluid evaporation tube and be distributed by capillary action or they can fall on a coating of microslots or microgrooves.

The improvement of the thermal efficiency on the three mentioned faces that go on to condense and evaporate at least in part in the condensing and evaporating capillary regime, allow to modulate the device in a compact format similar to the current ORV, that is, it allows the preparation of individual modules that can be placed in stackable batteries, each containing: at least one external hermetic container, inside which there is only an intermediate fluid in gaseous and liquid phases; at least one intermediate fluid evaporation tube passing through the hermetic container, which exchanges heat between a flow of moist air and the intermediate fluid, configured to cool the moist air therein, to condense on its inner face at least in part under the regime of capillary condensation at least a part of the water vapor contained in the moist air flow and evaporate on its outer face the liquid phase of an intermediate fluid disposed at least in part in menisci with curvature of the liquid-vapor interface; and at least one LNG evaporation tube passing through the hermetic container, which exchanges heat between the intermediate fluid and LNG to regasify natural gas, configured to condense on its outer face the gaseous phase of the intermediate fluid at least partly under the condensation capillary regime and inside heat and regasify LNG and heat the regasified NG natural gas.

The thermal properties of the LNG regasification device are improved if the mixture of air and water vapor that is introduced into the device contains more mass of water per volume of air. That is, the higher the air temperature and saturation, the better the performance of the device. Therefore, the LNG regasification device incorporates an ambient air humidification system that is used as an energy source.

The LNG regasification device can work with another energy source, so it can have several supply and evacuation circuits to work with a different source other than moist ambient air in winter times in non-equatorial zones when the air is too cool to contain enough air vapor and the thermal energy required by the device. So the LNG regasification device can have the versatility to operate with moist ambient air and when the air is too cool, operate with seawater or other fluid that provides energy.

These and other objects, advantages and features of the invention will become apparent upon review of the following specification in conjunction with the drawings.

BRIEF DESCRIPTION OF THE DRAWINGS

A more detailed explanation is given in the following description based on the attached figures.

DESCRIPTION OF THE PREFERRED EMBODIMENTS

A regasification device of liquefied natural gas, LNG, and co-generation of cool freshwater and cool dry air comprising at least one external hermetic container (1) containing an intermediate fluid in its liquid and gaseous phases, crossed by at least one intermediate fluid evaporation tube configured so that the fluid that provides heat energy to the device flows inside, and on its outer face the liquid phase of the intermediate fluid evaporates, and passing through at least one LNG evaporation tube configured so that on its outer face the gaseous phase of the intermediate fluid condenses and inside the LNG is heat up and changes phase and the regasified NG is heated up to a temperature greater than about 5° C.

Figure 1:
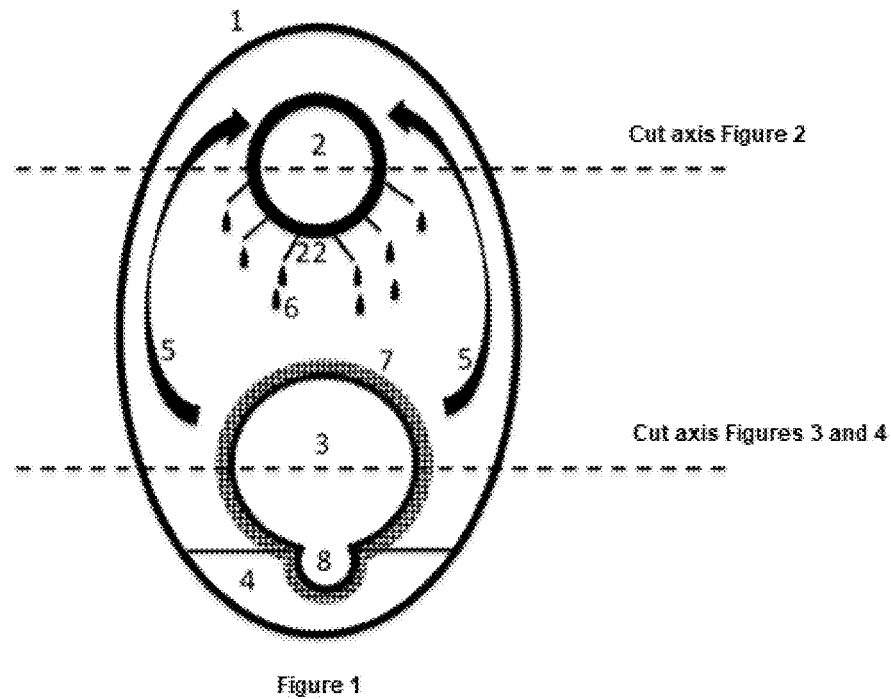
FIG. 1 is a cross section of an embodiment of a module of the LNG regasification device.

As illustrated in FIG. 1, the LNG regasification device is characterized in that the inner face of the intermediate fluid evaporation tube 3 is at least partially covered by a layer of microslots, microgrooves, sintering or other capillary structure. The fluid flowing inside the intermediate fluid evaporation tube 3 is moist air and the water vapor contained in this moist air condenses at least in part under capillary condensation on the microslots, microgrooves, sintering or other capillary structure that at least partially covers the inner face of the intermediate fluid evaporation tube 3. The moist air flowing inside the intermediate fluid evaporation tube 3 also yields sensible heat of air and water. At least a part of the latent heat and sensible heat released inside the intermediate fluid evaporation tube 3 passes through the wall of the intermediate fluid evaporation tube 3 and is transformed at least partly into latent heat for the phase change of the liquid phase of the intermediate fluid on the outer face of the intermediate fluid evaporation tube 3.

To prevent the accumulation of water on the inner wall of the intermediate fluid evaporation tube 3, at least one drain artery 8 is added, which neatly channels the cogenerated freshwater. This freshwater has given part of its sensible heat so that it leaves the interior of the intermediate fluid evaporation tube 3 at a cool temperature below about 5° C. and it is channeled away from the device for multiple uses.

The use of ambient air as an energy source does not cause the environmental problems caused by the use of seawater as an energy source.

The LNG regasification device is also characterized in that the intermediate fluid 4, 5, 6 is a fluid with a high latent heat of evaporation and with good capillary properties as $H_2O$, an aqueous solution of glycol or another solution of high latent heat and good capillary properties; and the outer face of the LNG evaporation tube 2 is coated at least in part with microslots, microgrooves, sintering or other capillary structure in which the gaseous phase 5 of the intermediate fluid is at least partially condensed under the capillary condensation regime. In order to avoid the formation of the solid phase of the intermediate fluid on the outer face of the LNG evaporation tube 2, the liquid phase of the intermediate fluid must not form accumulations of liquid in which the temperatures are stratified and solid phase of the intermediate fluid can be formed on the surface of the outer face of the intermediate fluid evaporation tube 2. The design of microslots, microgrooves, sintering or other capillary structure allows the correct evacuation of the liquid phase of the condensed intermediate fluid on the outer face of the LNG evaporation tube 2, as a design of microslots or microgrooves perpendicular to the axis of the LNG evaporation tube 2 and with longitudinal deflectors 22 that allow the evacuation by gravity of the condensed liquid phase on the surface of the outer face of the LNG evaporation tube 2 and its drip 6 on the intermediate fluid evaporation tube 3 or on the bottom of the hermetic container.

The LNG device is also characterized in that the intermediate fluid evaporation tube 3 is not submerged within the liquid phase 4 of the intermediate fluid which accumulates in the bottom of the hermetic container 1 and the outer face of the intermediate fluid evaporation tube 3 is coated at least in part of a sintering layer or other capillary structure which is in contact with the liquid phase 4 of the intermediate fluid accumulated in the bottom of the hermetic container 1 so that the liquid phase 4 of the intermediate fluid rises by capillary action and wets the outer face of the intermediate fluid evaporation tube 3.

If the LNG evaporation tube 2 is located in parallel or at least partly on the intermediate fluid evaporation tube 3, at least a part of the outer face of the intermediate fluid evaporation tube 3 can also be covered with microslots or microgrooves which are fed from the liquid phase of the intermediate fluid 6 dripping from the outer face of the LNG evaporation tube 2. The liquid phase 4, 6 of the intermediate fluid located in the microslots, microgrooves, sintering or other capillary structure covering at least part of the outer face of the intermediate fluid evaporation tube 3 is disposed at least partly in the form of menisci and in the surface of these menisci the curvature of the liquid-gas interface is formed that allows the high flow evaporation that occurs in the upper part of this curvature, capillary evaporation.

To achieve LNG regasification facilities with the usual high power of these installations, the LNG regasification device can be realized in the form of a set of modules with powers of each module similar to the power of the current modular tubes of the ORV devices.

Figure 2:
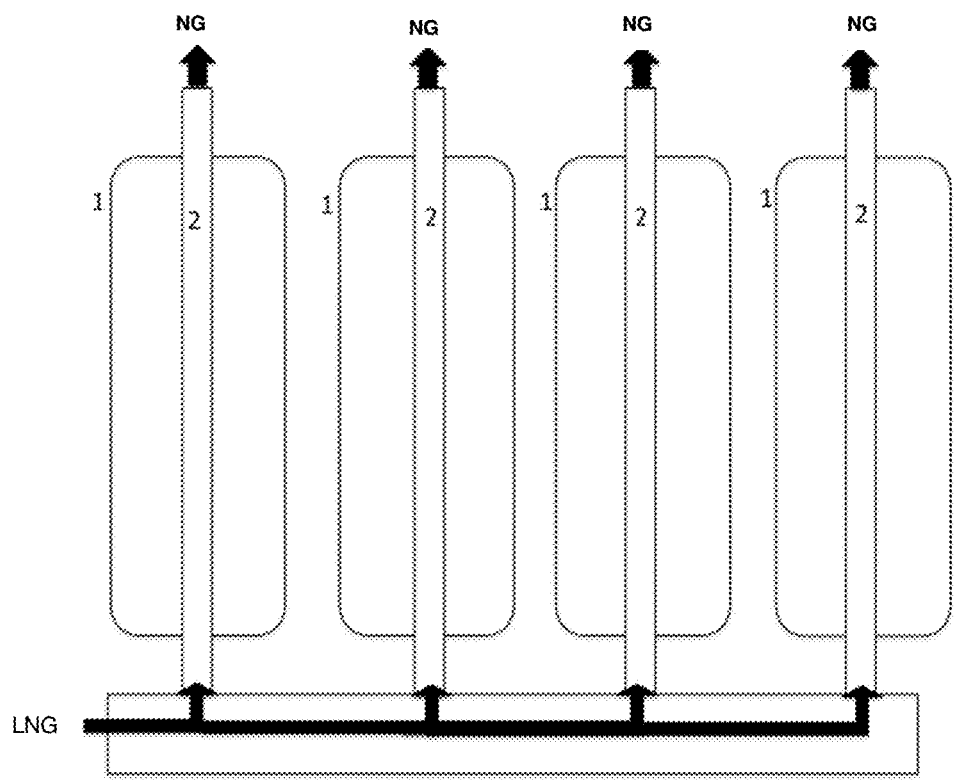
FIG. 2 is a plan view a cut section of a sequence of modules at the height of an LNG evaporation tube through which LNG flows, which is regasified in NG.

FIG. 2 shows the LNG regasification device composed of several modules arranged in a compact arrangement. For this reason we describe the LNG regasification device as composed of at least one external hermetic container 1 since it can be formed by several modules, each of them with at least one external hermetic container 1 with at least one intermediate fluid evaporation tube 3 and at least one LNG evaporation tube 2.

FIG. 2 shows a plan view of a cut section at the height of an LNG evaporation tube 2 in a four-module configuration of the LNG regasification device fed in parallel of LNG and from each of them natural gas NG is extracted resulting from regasification.

Working horizontally, the LNG regasification device modules can be stacked, achieving a compact design and easily accessible at both ends for maintenance and control of the LNG regasification device.

This modular embodiment can be formulated with a greater or lower number of modules of the LNG regasification device and allows to obtain LNG regasification devices in a compact format, with low manufacturing cost, low operating cost and with a great ease of starting-up and stoppage that allows to quickly adjust the production of the facility according to the needs of production of natural gas that mark the demand and with a very reduced impact on the environment.

Figure 3:
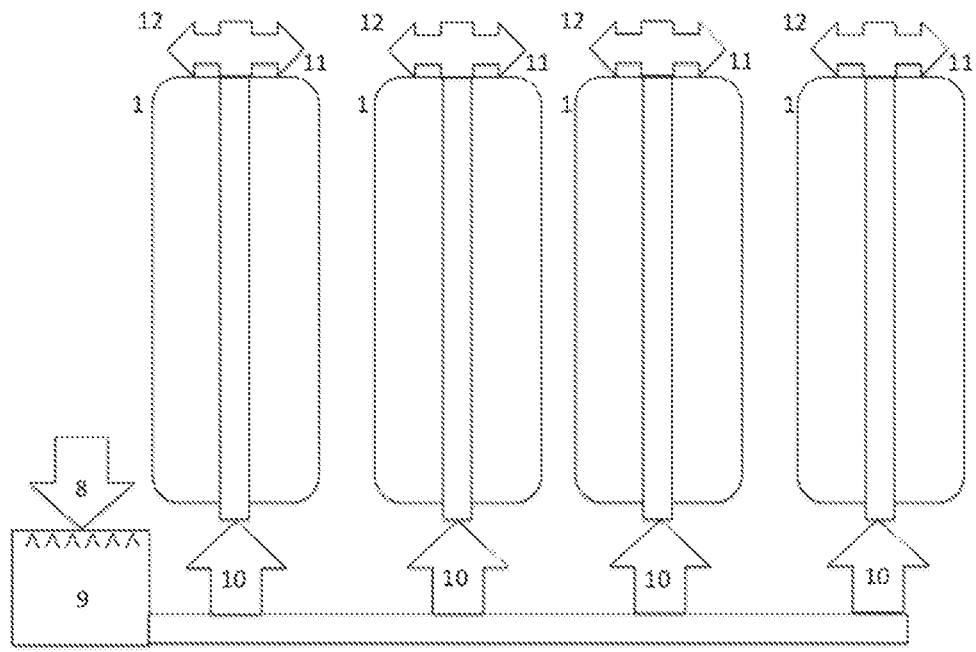
FIG. 3 is a plan view a cut section of a sequence of modules at the height of an intermediate fluid evaporation tube, with an air humidifying device.

FIG. 3 shows a plan view of a cut section at the height of an intermediate fluid evaporation tube 3 in a four-module configuration of the LNG regasification device fed in parallel with ambient air charged with humidity 10 coming from ambient air 8 which is loaded with humidity by means of a humidifier 9.

The water vapor contained in the moist air 10 is condensed and cooled in at least one intermediate fluid evaporation tube 3 through which it circulates along the module and at the end cool air 11 and cool freshwater 12 are channeled for its subsequent use. This co-generation of cool air 11 and cool freshwater 12 allows the correct management of the cool generated in the regasification process, and this cool can be recycled for various uses without causing the environmental problems that arise if this cool is poured into the marine environment.

The humidification device 9 of the ambient air can use seawater by bubbling the air through a thin layer of seawater, seawater shower over ambient air or other humidification systems. This process for humidifying air can be executed without the need to cool the seawater. The latent heat necessary for part of the seawater to pass into the gaseous phase and humidify the air can be compensated by the contribution of sensible heat from the ambient air, resulting in a very small change in the temperature of the seawater that is returned to the marine environment.

If the ambient air temperature is higher than the seawater temperature and the freshwater co-generation capacity of the LNG regasification device is to be increased, then the LNG regasification device may include a heat exchange device between the ambient air and the seawater as shower systems or others that allow raising the temperature of the seawater, while allowing to saturate the ambient air with humidity. The seawater thus heated can be used as a heat source in a seawater desalination device and the air saturated with humidity can be used as a heat source for the regasification of LNG.

The air comes out cool at the end of the LNG regasification process, as does the condensed freshwater in this process. Thus, freshwater production can be multiplied in a multi-effect distillation process using seawater heated with ambient air as a heat source from the desalination process and, using the cool air and/or cool freshwater as an energy sink resulting from the LNG regasification process.

The thermal jump between the seawater heated with ambient air and the cool air or co-generated cool freshwater can be placed in a range of about 25° C. to 30° C., and with this thermal jump several evaporation and condensation processes can be carried out multiplying the capacity of freshwater co-generation of the LNG regasification device if it is coupled to thermally efficient devices as described in the patent application PCT/ES2015/070344, incorporated herein by reference.

Figure 4:
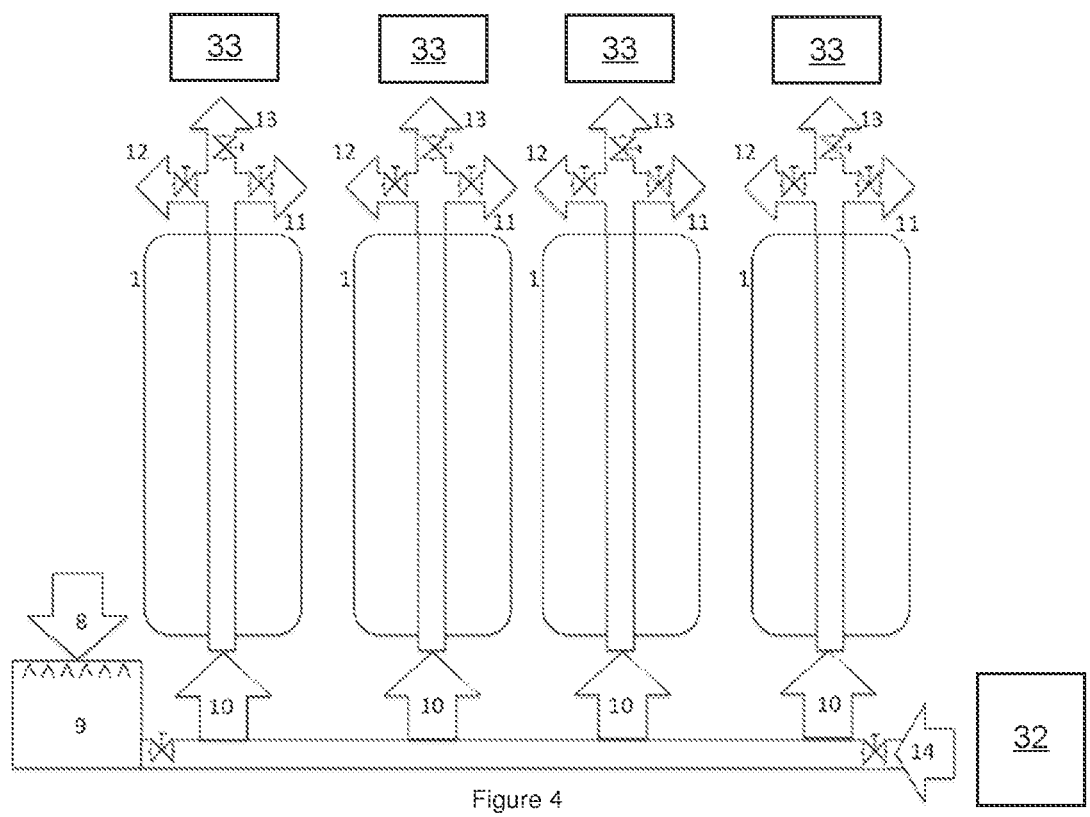
FIG. 4 is a plan view a cut at the height of an intermediate fluid evaporation tube of a sequence of modules adapted to be compatible with heat sources other than moist ambient air.

FIG. 4 shows a plan view of a cut section at the height of an intermediate fluid evaporation tube 3, in a configuration of four modules of the LNG regasification device as shown in FIG. 3 adapted to be used in cool seasons of non-equatorial zones in which during the winter season the ambient air is too cool to contain enough energy and water vapor, so that the LNG regasification device has an alternative supply system 32 to operate with a heat source that is a fluid 14 other than moist ambient air, such as seawater, residual steam from a combustion, or an intermediate fluid with energy from any other source of energy, the LNG regasification device has an evacuation system 33 in one way specific 13 for the recirculation or pouring of the alternative fluid.

The thermal coefficient of the interior face of the intermediate fluid evaporation tube 3, when a fluid other than moist ambient air, such as seawater, is supplied during the winter season, may be lower than the thermal coefficient when the fluid circulating in the intermediate fluid evaporation tube 3 is moist ambient air, in such a way that to maintain the aggregate power of the LNG regasification device it is possible to have additional modules for the winter period or add a support gas combustion system for peak demand in winter times.

Figure 5:
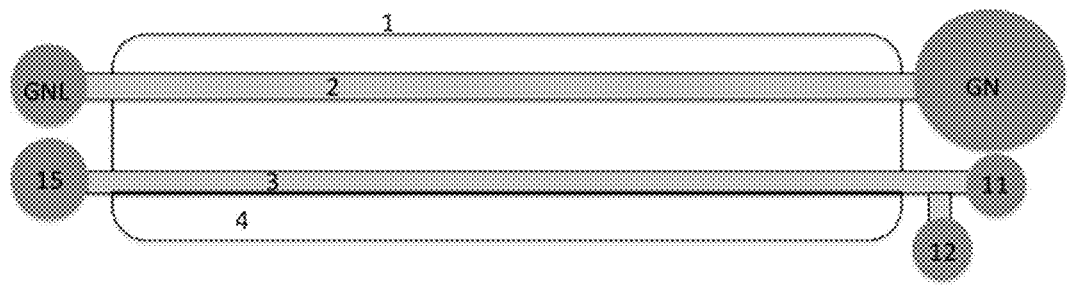
FIG. 5 is a section in longitudinal cut of a module of the LNG regasification device.
Figure 6:
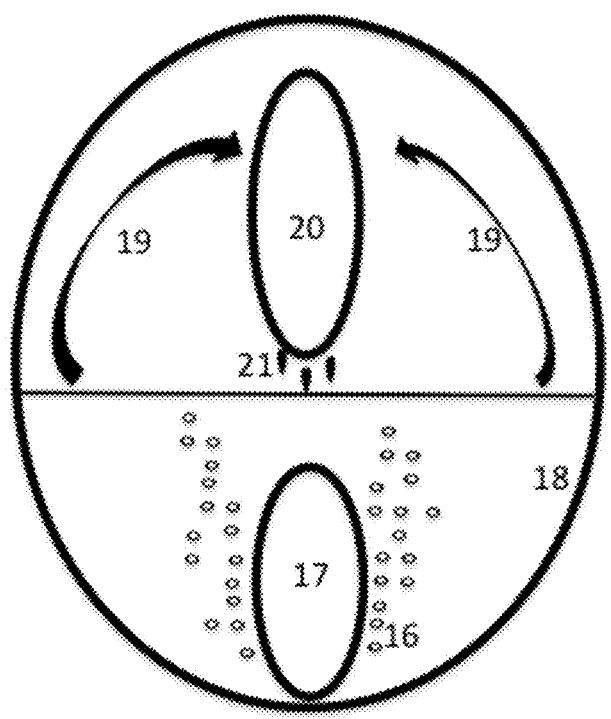
FIG. 6 is a section in cross-section of an added scheme of the current HC-IFV devices with the intermediate fluid evaporation tube submerged within the liquid phase of the intermediate fluid.
Figure 7:
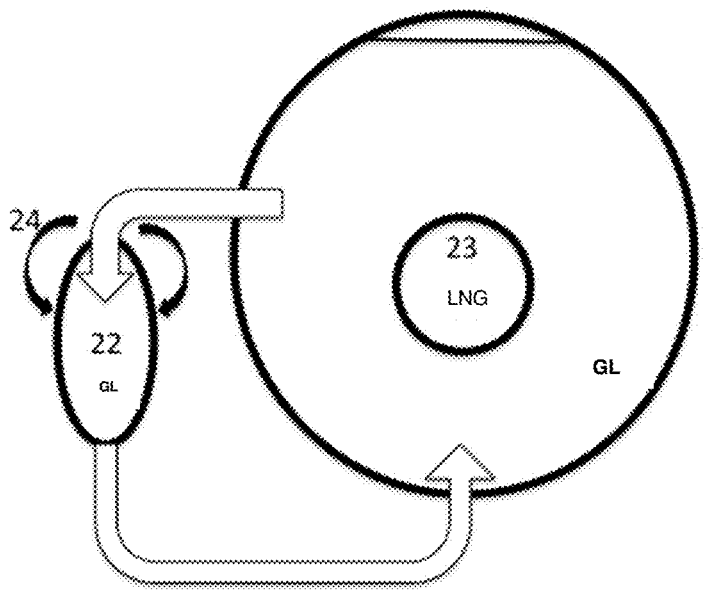
FIG. 7 is, in cross-section, a scheme of the current (prior art) glycol-IFV devices with the LNG evaporation tube submerged within a volume of aqueous glycol solution.

FIG. 5 shows a longitudinal section of a module of the LNG regasification device as shown in FIGS. 2 and 3 for better understanding, showing the longitudinal section of an LNG evaporation tube 2 and an intermediate fluid evaporation tube 3, and the cross-section of a LNG supply duct, supply of moist ambient air 15, extraction of natural gas NG and extraction of condensed water 12 and cool air 11.

Figure 8:
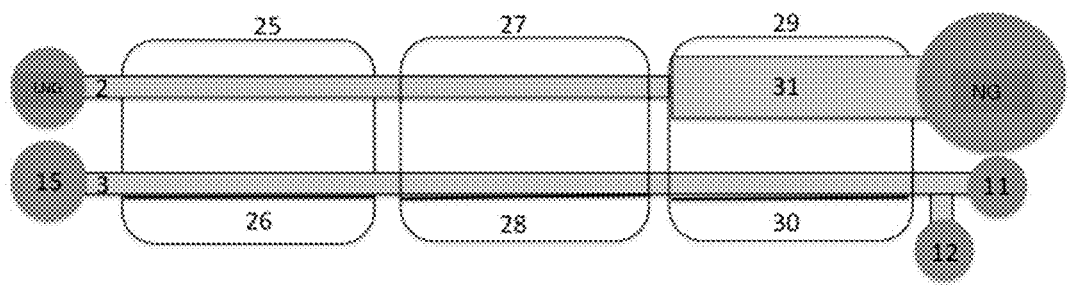
FIG. 8 is a section in longitudinal cut a module of the LNG regasification device with more than one compartment.

The LNG is supplied to the LNG evaporation tube 2 around −163° C. and leaves the LNG evaporation tube 2 above about 5° C. In order to reduce the thermal stress that this thermal jump entails, the LNG regasification device or the modules that make up the LNG regasification device can be compartmented as shown in FIG. 8 by means of two or more external hermetic containers 25, 27, 29. This compartmentalization limits the operating temperature ranges of the intermediate fluid in each compartment and optimizes the heat transfer by stabilizing the working temperature regime in each compartment. Each compartment may have a specific intermediate fluid 26, 28, 30 for its specific thermal requirements.

There are basically three sections in the LNG regasification process, first a LNG heating section from −163° C. up to the phase change temperature corresponding to the pressure to which LNG is subjected, then an isothermal phase change section and finally, the final heating section of the resulting natural gas NG up to a temperature above about 5° C. In this third section, the natural gas NG is already in the gaseous phase and the compartmentalization allows the LNG evaporation tube 2 to adapt its section 31 or bifurcate into several tubes to adapt to the needs of the natural gas NG in the gaseous phase. Compartmentalization can be done using other temperature ranges.

Compartmentalization reduces the temperature stress of the LNG regasification device and thus makes it cheaper in terms of the materials requirements. Compartmentalization allows the insertion of fluid control and management devices between compartments such as expansion turbines, control valves or additional systems for the evacuation of condensed freshwater or cool air, and additional systems for the supply of moist air.

The LNG regasification device can be used for regasification of other cryogenic liquids and can even be used for other heat exchange processes among other fluids. Therefore, it will be understood that the invention is not limited to the emodiment(s) described herein, but can be amended or modified without departing from the scope of the present invention, which is intended to be limited only by the scope of the appended claims as interpreted according to the principles of patent law including the doctrine of equivalents.

The invention claimed is:

1. A regasification device for liquefied natural gas (LNG) and co-generation of cooler-than-ambient freshwater and air that is cooler-than-ambient and drier-than-ambient, the device comprising:
at least one external hermetic container containing an intermediate fluid in its liquid and gaseous phases;
an inside of the external hermetic container crossed by at least one intermediate fluid evaporation tube inside which a fluid that provides caloric energy to the device flows and on whose outer face the liquid phase of the intermediate fluid evaporates;
the inside of the external hermetic container crossed by at least one LNG evaporation tube configured so that when the fluid that provides caloric energy to the device flows through the at least one intermediate fluid evaporation tube, the gaseous phase of the intermediate fluid condenses on the LNG evaporation tube's outer face and in its interior LNG is heated and changes phase and the resulting regasified natural gas (NG) is heated up to a temperature greater than 5° C.;
wherein the fluid flowing in the interior of the at least one intermediate fluid evaporation tube is ambient air and the inner face of at least one intermediate fluid evaporation tube is coated at least in part with microslots, microgrooves, or sintering on which the water vapor contained in the ambient air undergoes capillary condensation.

2. The regasification device according to claim 1, wherein the at least one intermediate fluid evaporation tube has a drain artery for condensed water on an interior wall of the at least one intermediate fluid evaporation tube.

3. The regasification device according to claim 1, wherein the intermediate fluid is a fluid with the latent heat of evaporation and the capillary properties of exhibited by water ($H_2O$) and aqueous solutions.

4. The regasification device according to claim 3, wherein at least a portion of the outer face of the at least one LNG evaporation tube is coated with microslots, microgrooves, or sintering so that the capillary condensation of the gaseous phase of the intermediate fluid occurs on the outer face of the LNG evaporation tube.

5. The regasification device according to claim 4, wherein at least a portion of the outer face of the at least one intermediate fluid evaporation tube is covered by sintering for the capillary rise of the liquid phase of the intermediate fluid from the bottom of the hermetic container, for the distribution of the liquid phase of the intermediate fluid dripping from the outer face of the LNG evaporation tube on the outer face of the intermediate fluid evaporation tube and for the formation of menisci of the liquid phase of the intermediate fluid in which the curvature of the liquid-gas interface occurs, at the upper end of which capillary evaporation occurs.

6. The regasification device according to claim 5, wherein at least a portion of the outer face of the at least one intermediate fluid evaporation tube is covered by microslots or microgrooves in which menisci of the liquid phase of the working fluid are formed and evaporation from the liquid-gas interface curve at the end of the meniscus occurs.

7. The regasification device according to claim 1, comprising at least one module that is compartmented in two or more compartments that are operable within different temperature ranges, and that have different respective intermediate fluids, wherein the two or more compartments are configured so that fluid management and fluid control devices are insertable between the compartments, each module including at least one external hermetic containers.

8. The regasification device according to claim 1, further comprising an air humidifier for increasing the content of water vapor mixed with the ambient air flowing inside the intermediate fluid evaporation tube.

9. A regasification device for a cryogenic fluid other than liquefied natural gas and co-generation of cooler-than-ambient freshwater and air that is cooler-than-ambient and drier-than-ambient, said device comprising:
at least one external hermetic container containing an intermediate fluid in its liquid and gaseous phases;
an inside of the external hermetic container crossed by at least one intermediate fluid evaporation tube inside which a fluid that provides caloric energy to the device flows and on whose outer face the liquid phase of the intermediate fluid evaporates;
the inside of the external hermetic container crossed by at least one cryogenic fluid evaporation tube configured so that when the fluid that provides caloric energy to the device flows through the at least one intermediate fluid evaporation tube, the gaseous phase of the intermediate fluid condenses on the cryogenic fluid evaporation tube and in its interior cryogenic fluid is heated and changes phase and the resulting regasified cryogenic fluid is heated up to a temperature greater than 5° C.;
wherein the fluid flowing in the interior of at least one intermediate fluid evaporation tube is ambient air and the inner face of at least one intermediate fluid evaporation tube is coated at least in part with microslots, microgrooves, or sintering on which the water vapor contained in the ambient air undergoes capillary condensation.

10. The regasification device according to claim 9, wherein the at least one intermediate fluid evaporation tube has a drain artery for condensed water on an interior wall of the at least one intermediate fluid evaporation tube.

11. The regasification device according to claim 10, wherein at least a portion of the outer face of the at least one cryogenic fluid evaporation tube is coated with microslots, microgrooves, or sintering so that capillary condensation of the gaseous phase of the intermediate fluid occurs on the outer face of the cryogenic fluid evaporation tube.

12. The regasification device according to claim 11, wherein at least a portion of the outer face of the at least one intermediate fluid evaporation tube is covered by sintering for the capillary rise of the liquid phase of the intermediate fluid from the bottom of the hermetic container, for the distribution of the liquid phase of the intermediate fluid dripping from the outer face of the cryogenic fluid evaporation tube on the outer face of the intermediate fluid evaporation tube and for the formation of menisci of the liquid phase of the intermediate fluid in which the curvature of the liquid-gas interface occurs, at the upper end of which capillary evaporation occurs.

13. The regasification device according to claim 12, wherein at least a portion of the outer face of the at least one intermediate fluid evaporation tube is covered by microslots or microgrooves in which menisci of the liquid phase of the working fluid are formed and evaporation from the liquid-gas interface curve at the end of the meniscus occurs.

14. A regasification device for a cryogenic fluid other than liquefied natural gas and co-generation of cooler-than-ambient liquid and air that is cooler-than-ambient and drier-than-ambient, the device comprising:
at least one external hermetic container containing an intermediate fluid in its liquid and gaseous phases;
an inside of the external hermetic container crossed by at least one intermediate fluid evaporation tube inside which a fluid that provides caloric energy to the device flows and on whose outer face the liquid phase of the intermediate fluid evaporates;
the inside of the external hermetic container crossed by at least one cryogenic fluid evaporation tube configured so that when the fluid that provides caloric energy to the device flows through the at least one intermediate fluid evaporation tube, the gaseous phase of the intermediate fluid condenses on the cryogenic fluid evaporation tube's outer face and in its interior cryogenic fluid is heated and changes phase and the resulting regasified cryogenic fluid is heated up to a temperature greater than 5° C.;
wherein the fluid flowing in the interior of at least one intermediate fluid evaporation tube comprises air and another vapor, and the inner face of at least one intermediate fluid evaporation tube is coated at least in part with microslots, microgrooves, or sintering on which the other vapor contained in the air undergoes capillary condensation.

15. The regasification device according to claim 14, wherein the at least one intermediate fluid evaporation tube has a drain artery for condensed liquid on an interior wall of the at least one intermediate fluid evaporation tube.

16. The regasification device according to claim 15, wherein at least a portion of the outer face of the at least one cryogenic fluid evaporation tube is coated with microslots, microgrooves, or sintering so that the condensation of the gaseous phase of the intermediate fluid undergoes capillary condensation on the outer face of the cryogenic fluid evaporation tube.

17. The regasification device according to claim 16, wherein at least a portion of the outer face of the at least one intermediate fluid evaporation tube is covered by sintering for the capillary rise of the liquid phase of the intermediate fluid from the bottom of the hermetic container, for the distribution of the liquid phase of the intermediate fluid dripping from the outer face of the cryogenic fluid evaporation tube on the outer face of the intermediate fluid evaporation tube and for the formation of menisci of the liquid phase of the intermediate fluid in which the curvature of the liquid-gas interface occurs, at the upper end of which capillary evaporation occurs.

18. The regasification device according to claim 17, comprising at least one module that is compartmented in two or more compartments that are operable within different temperature ranges, and that have intermediate fluids adapted to the thermal needs of each temperature range, wherein the two or more compartments are configured so that fluid management and fluid control devices are insertable between the compartments.

* * * * *

UNITED STATES PATENT AND TRADEMARK OFFICE
CERTIFICATE OF CORRECTION

PATENT NO. : 11,619,352 B2
APPLICATION NO. : 16/322722
DATED : April 4, 2023
INVENTOR(S) : Juan Eusebio Nomen Calvet and Dan Alexandru Hanganu Page 1 of 1

It is certified that error appears in the above-identified patent and that said Letters Patent is hereby corrected as shown below:

In the Claims
Column 10
Line 8, Claim 4, delete "the" after --that--

Signed and Sealed this
Fourth Day of July, 2023

Katherine Kelly Vidal
*Director of the United States Patent and Trademark Office*